2 Sheets—Sheet 1.
W. P. & C. E. CLARK.
Horse Hay-Rake.
No. 207,392. Patented Aug. 27, 1878.
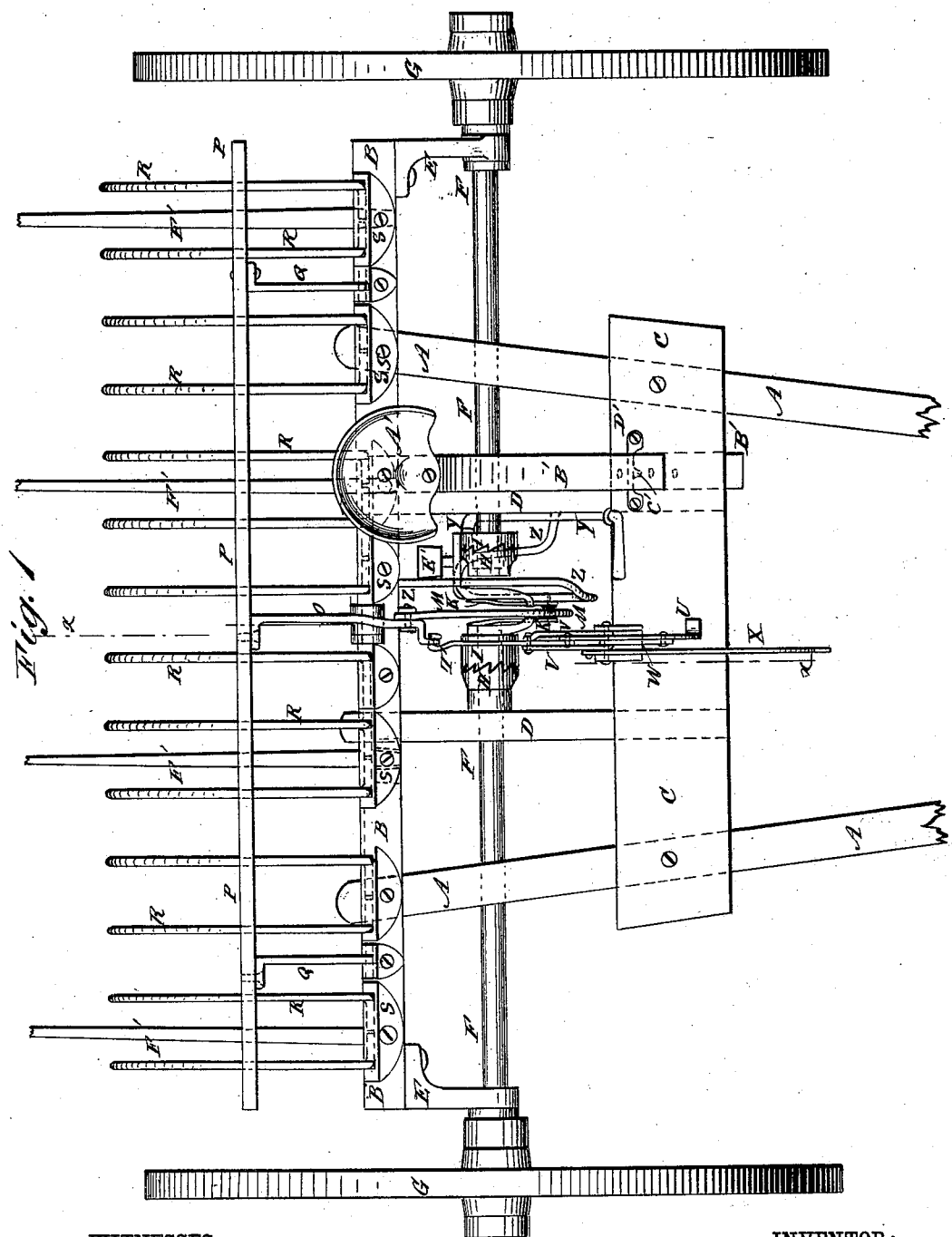
WITNESSES:
C. Neveux
C. Sedgwick
INVENTOR:
W. P. Clark
C. E. Clark
BY
ATTORNEYS.

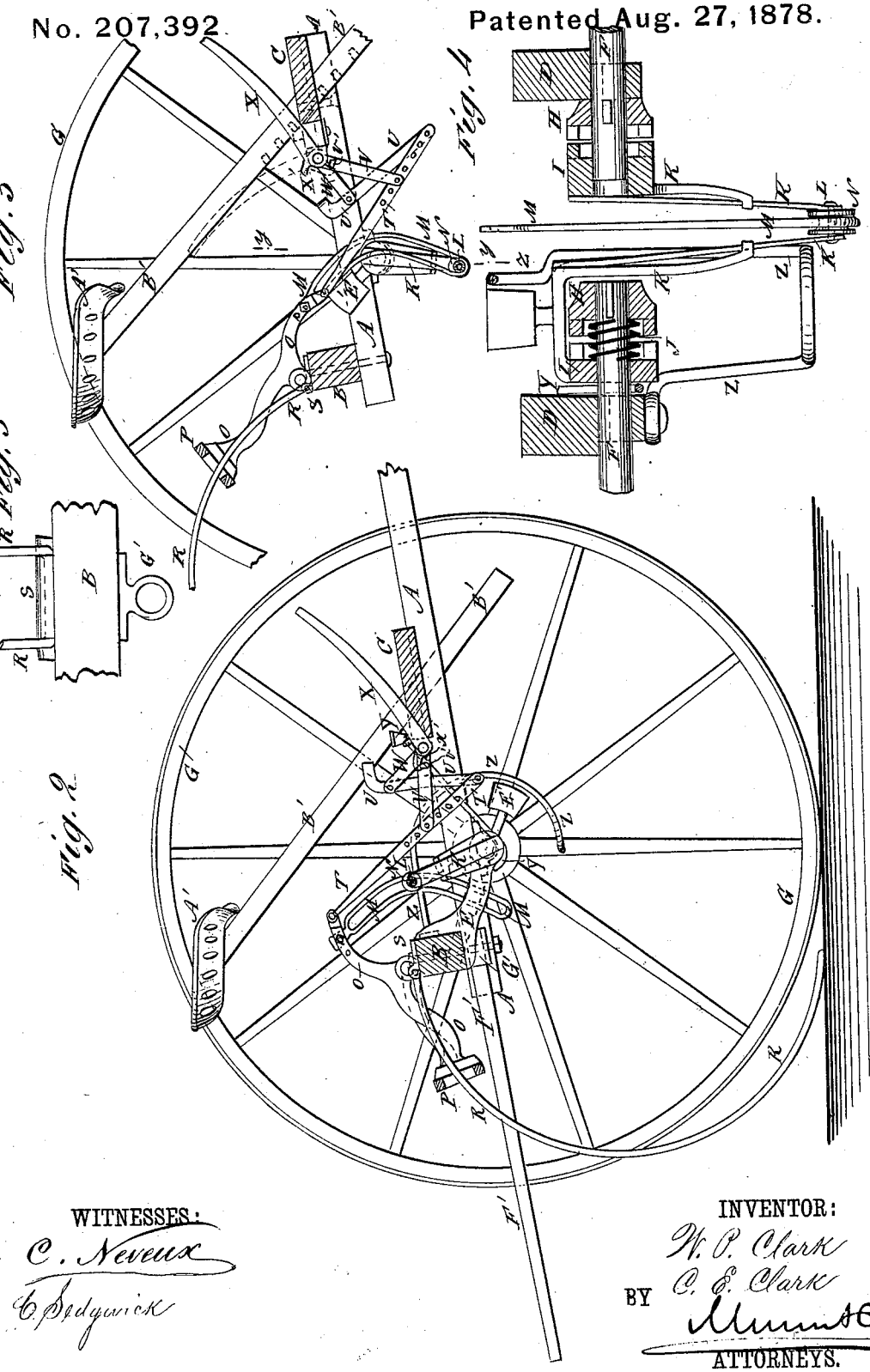

UNITED STATES PATENT OFFICE.

WILLIAM P. CLARK AND CHARLES E. CLARK, OF BELMONT, NEW YORK.

IMPROVEMENT IN HORSE HAY-RAKES.

Specification forming part of Letters Patent No. 207,392, dated August 27, 1878; application filed June 17, 1878.

*To all whom it may concern:*

Be it known that we, WILLIAM PENDLETON CLARK and CHARLES ETHAN CLARK, of Belmont, in the county of Allegany and State of New York, have invented a new and useful Improvement in Horse Hay-Rakes, of which the following is a specification:

Figure 1, Sheet 1, is a top view of our improved rake. Fig. 2, Sheet 2, is a vertical section of the same, taken through the line $xx$, Fig. 1, and showing the rake-teeth in working position. Fig. 3, Sheet 2, is the same section as Fig. 2, but showing the rake-teeth raised. Fig. 4, Sheet 2, is a detail section taken through the line $yy$, Fig. 3. Fig. 5, Sheet 2, is a detail view, showing a clearer-stick socket.

The object of this invention is to furnish an improved horse hay-rake, which shall be so constructed that the teeth may be raised to drop the collected hay by the revolution of the drive-wheels, or by the driver with a hand-lever.

The invention consists in the combination of the stationary half-clutches, the movable half-clutches, the crank-arms connected at their outer ends by the bolt and friction-wheel, the curved slotted arm, the lever, and the weight with each other, and with the inner ends of the axles, the rake-head, the slotted cross-bar, the rake-teeth, and the drive-wheels; in the combination of the pivoted connecting-bar, the pivoted foot-lever, the pivoted connecting-bars, and the pivoted fulcrum-bar with the pivoted lever, the rake-head, the cross-bar, the rake-teeth, and the thill cross-bar; and in the combination of the springs, the foot-lever, and the guard with the movable half-clutches and their crank-arms.

A are the thills, the rear ends of which are rigidly attached to the lower side of the rake-head B, and which are connected at a little distance from their rear ends by a cross-bar, C.

D are two bars, the rear ends of which are attached to the lower side of the head B, and their forward ends are attached to the lower side of the cross-bar C. The end parts of the rake-head B are securely bolted to the rear ends of the arms E, in the forward ends of which are formed holes to serve as bearings for the axles F.

To the outer ends of the axles F are rigidly attached the drive-wheels G, so that the said axles may be carried around by and with the said drive-wheels in their revolution. The axles F are placed parallel with the rake-head B, and in line with each other, as shown in Fig. 1.

The inner parts of the axles F revolve in bearings attached to the bars D, and their inner ends nearly meet between the said bars, space being left between the said ends for the passage of the clutch crank-arms.

To the inner end of one of the axles F, and to the other axle, near its inner end, are rigidly attached the half-clutches H, with the teeth of which engage the teeth of the half-clutches I, which are placed loosely upon the axles F, the one upon the outer and the other upon the inner side of the said half-clutches H, so that the movable half-clutches I may be thrown into gear by moving them in the same direction. The movable half-clutches I are held out of gear by spiral springs J, interposed between them and the rigid half-clutches H.

To the movable half-clutches I are rigidly attached, or upon them are formed, crank-arms K, the outer ends of which are connected by a bolt, L. The bolt L passes through the curved slot of the curved arm M, and has a small grooved friction-wheel, N, placed upon it to diminish the friction between it and the said slotted arm M. The upper end of the slotted arm M is pivoted to the forward end of the lever O, which is pivoted at its middle part to the middle part of the rake-head B. The rear end of the lever O is rigidly attached to the middle part of the cross-bar P.

The end parts of the cross-bar P are rigidly attached to the rear ends of the arms Q, the forward ends of which are hinged to the end parts of the rake-head B. In the cross-bars P are formed short cross-slots for the passage of the curved rake-teeth R. The rake-teeth R are made of spring-wire, bent into the proper curve, and having their upper ends bent to one side at a right angle, or into L form.

The rake-teeth R are hinged to the rake-head B by the plates S, which are bolted to the upper side of the said rake-head B, and have grooves in their under sides, along their rear edges, to receive the L of the rake-teeth R, and notches in their rear edges to receive the bodies of the said teeth, to keep the said Ls from slipping out. This construction hinges the rake-teeth R in such a way that they may have a vertical but not a lateral play, to allow them to rise to pass obstructions and to be raised to discharge the collected hay.

The short slots in the cross-bar P allow each rake-tooth R to rise and pass obstructions independently of the others.

To the forward end of the lever O is pivoted the upper end of the connecting-bar T, to the lower end of which is pivoted the rear end of the foot-lever U.

To the connecting-bar T, a little above its lower end, are pivoted the upper ends of two connecting-bars, V, the lower ends of which are pivoted to lugs attached to the rear edge of the cross-bar C.

To the lower ends of the connecting-bars V is pivoted the lower end of the connecting-bar W, the upper end of which is pivoted to the foot-lever U near its forward end, so as to serve as a fulcrum to the said foot-lever U.

To the lower ends of the connecting-bars V W is pivoted the lower end of the hand-lever X. Upon the lower end of the hand-lever X is formed a toe, $x'$, which rests against a projection, $v'$, formed upon the side of one of the bars V.

Y is a bent foot-lever, the rear end of which is connected with one of the movable half-clutches I, so that by operating the said foot-lever Y the clutches I H may be thrown into gear, and the rake-teeth raised by the revolution of the drive-wheels G, to discharge the collected hay.

By this construction, as the crank-arms K are carried around by and with the clutches H I, when the bolt L and friction-wheel N reach the lower end of the slot in the arm M, the said arm operates the lever O to raise the rake-teeth R and discharge the collected hay. As the crank-arms K pass the lowest point of their revolution and begin to rise, the rake-teeth R drop back to the ground by their own weight. With this construction the driver holds the rake-teeth R down to their work by pressing with his foot upon the forward end of the foot-lever U.

The clutches H I are held in gear until their crank-arms K reach the lowest point of their revolution by a curved guard, Z, along which the said crank-arms move, and the ends of which are attached to the rake-head B and bar D. As the crank-arms K pass from the lower end of the guard Z the clutches H I are thrown out of gear by the spiral springs J, and the said crank-arms K are raised into an erect position by a weight, E', attached to them or to the side of the movable half-clutches I.

A' is the driver's seat, which is attached to the upper end of the inclined standard B'. The lower part of the seat-standard B' passes down through an inclined hole through the cross-bar C, and is supported by a pin, C', formed upon the bar D', and which enters a hole or recess in the said standard B'.

Several holes are formed in the standard B' to receive the pin C', so that the seat A' may be raised and lowered as may be required. The bar D' is bolted to the cross-bar C in the rear of the seat-standard B'. The collected hay is pushed off the rake-teeth R as they are raised by the clearer-sticks F', which may be made of wood or iron, and which are inserted in metal sockets G', attached to the lower side of the rake-head B, as shown in Fig. 5.

Having thus described our invention, we claim as new and desire to secure by Letters Patent—

1. The combination of the stationary half-clutches H, the movable half-clutches I, the crank arms K, connected at their outer ends by the bolt and friction-wheel L N, the curved slotted arm M, the lever O, and the weight E' with each other and with the inner ends of the axles F, the rake-head B, the slotted cross-bar P, the rake-teeth R, and the drive-wheels G, substantially as herein shown and described.

2. The combination of the pivoted connecting-bar T, the pivoted foot-lever U, the pivoted connecting-bars V, and the pivoted fulcrum-bar W with the pivoted lever O, the rake-head B, the cross-bar P, the rake-teeth R, and the thill cross-bar C, substantially as herein shown and described.

3. The combination of the springs J, the foot-lever Y, and the guard Z with the movable half-clutches I and their crank-arms K, substantially as herein shown and described.

WILLIAM P. CLARK.
CHARLES E. CLARK.

Witnesses:
J. W. CHASE,
C. CHASE.